(12) United States Patent
Nakisa

(10) Patent No.: US 6,480,832 B2
(45) Date of Patent: *Nov. 12, 2002

(54) METHOD AND APPARATUS TO MODEL THE VARIABLES OF A DATA SET

(75) Inventor: Ramin C. Nakisa, Little Chalfont (GB)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,498

(22) Filed: Jan. 14, 1999

(65) Prior Publication Data

US 2002/0062296 A1 May 23, 2002

(30) Foreign Application Priority Data

Mar. 13, 1998 (GB) ............................................. 9805260

(51) Int. Cl.$^7$ ................................................. G06N 3/12

(52) U.S. Cl. ........................... 706/13; 706/16; 706/45; 706/46; 706/59

(58) Field of Search .............................. 706/13, 16, 45, 706/46, 59

(56) References Cited

U.S. PATENT DOCUMENTS

| | | | |
|---|---|---|---|
| 5,214,746 A | | 5/1993 | Fogel et al. |
| 5,245,696 A | | 9/1993 | Stork et al. |
| 6,088,690 A | * | 7/2000 | Gounares et al. ............. 706/13 |
| 6,128,607 A | * | 10/2000 | Nordin et al. ................. 706/13 |
| 6,154,736 A | * | 11/2000 | Chickering et al. ........... 706/59 |
| 6,157,921 A | * | 12/2000 | Barnhill ........................ 706/16 |
| 6,192,354 B1 | * | 2/2001 | Bigus et al. ................... 706/46 |

FOREIGN PATENT DOCUMENTS

WO 9011568 10/1990

OTHER PUBLICATIONS

Proc. 6$^{th}$ Conference on Artificial Intelligence in Medicine Europe, AIME 97, pp 261–272, Springer–Verlag 1997, Larranaga P et al., "Learning Bayesian networks by genetic algorithms: a case study in the prediction of survival in malignant skin melanoma".

(List continued on next page.)

Primary Examiner—Wilbert L. Starks, Jr.
(74) Attorney, Agent, or Firm—Peter H. Priest

(57) ABSTRACT

The present invention relates to modeling the variables of a data set by means of a robabilistic network including data nodes and causal links. The term 'probabilistic networks' includes Bayesian networks, belief networks, causal networks and knowledge maps. The variables of an input data set are registered and a population of genomes is generated each of which individually models the input data set. Each genome has a chromosome to represent the data nodes in a probabilistic network and a chromosome to represent the causal links between the data nodes. A crossover operation is performed between the chromosome data of parent genomes in the population to generate offspring genomes. The offspring genomes are then added to the genome population. A scoring operation is performed on genomes in the said population to derive scores representing the correspondence between the genomes and the input data. Genomes are selected from the population according to their scores and the crossover, scoring, addition and selecting operations for a plurality of generations of the genomes. Finally a genome is selected from the last generation according to the best score. A mutation operation may be performed on the genomes. The mutation may consist of the addition or deletion of a data node and the addition or deletion of a causal link.

28 Claims, 3 Drawing Sheets

OTHER PUBLICATIONS

IEEE Transactions on Systems, Man and Cybernetics, Part A (Systems & Humans), v26, n4, pp 487–493, Jul. 1996, Larranaga P et al., "Learning Bayesian network structures by searching for the best ordering with genetic algorithms".

Larranaga, P.; Poza, M.; Yurramendi, Y.; Murga, R.H.; Kuijpers, C.M.H., Structure learning of Bayesian networks by genetic algorithms: a performance analysis of control parameters, Pattern Analysis and Machine Intelligence, IEEE Transactions on, vol.: 1, Sep. 1996.*

Takara, T.; Higa, K.; Nagayama, I., Isolated word recognition using the HMM structure selected by the genetic algorithm, Acoustics, Speech, and Signal Processing, 1997. ICASSP-97., 1997 IEEE International Conference on, vol.: 2, Apr. 21–24, 1997, Page(s).*

Chau, C.W.; Kwong, S.; Diu, C.K.; Fahrner, W.R., Optimization of HMM by a genetic algorithm, Acoustics, Speech, and Signal Processing, 1997. ICASSP-97., 1997 IEEE International Conference on, vol.: 3, Apr. 21–24, 1997, pp.: 1727–1730 vol. 3.*

Christoph F. Eick and Daw Jong; Learning Bayesian classification rules through genetic algorithms; Proceedings of the second international conference on Information and knowledge management, Nov. 1–5, 1993, pp. 305–313.*

Fang Sun; Guangrui Hu, Speech recognition based on genetic algorithm for training HMM, Electronics Letters vol.: 34 16, Aug. 6, 1998, pp.: 1563–1564.*

* cited by examiner

| | $D_1$ | $D_2$ | $D_3$ | $D_4$ | $D_M$ |
|---|---|---|---|---|---|
| AGE | | | | | |
| SEX | | | | | |
| ADDRESS | | | | | |
| OCCUPATION | | | | | |
| INCOME | | | | | |
| TELEPHONE | | | | | |
| INTERNET | | | | | |
| BRANCH | | | | | |
| INSURANCE SERVICES | $D_N$ | | | | $D_{M \times N}$ |

METHOD AND APPARATUS TO MODEL THE VARIABLES OF A DATA SET

BACKGROUND OF THE INVENTION

The present invention relates to a method and apparatus for modeling the variables of a data set by means of a probabilistic network including data nodes and causal links.

Probabilistic networks are graphical models of cause and effect relationships between variables in a data set. Such networks are referred to in the literature as Bayesian networks, belief networks, causal networks and knowledge maps. In this specification, the term probabilistic networks will be used generically to refer to all such networks and maps. The graphical model in each case includes data nodes, to represent the variables, and causal links or arcs, to refer to the dependencies connecting between the data nodes. A given set of nodes and arcs defines a network structure.

Once a network structure has been found that accurately models a set of data, the model summarizes knowledge about possible causal relationships between the variables in the data set. Such a model allows knowledge about relationships between variables in a large set of data to be reduced to a concise and comprehensible form and is the primary goal of data mining.

One of the difficulties with modeling a set of data using a probabilistic network is to find the most likely network structure to fit a given input data set. This is because the search space of possible network structures increases exponentially with the number of data nodes in the network structure. An exhaustive evaluation of all the possible networks to measure how well they fit the input data set has been regarded as impractical even when limited to modest sized network structures.

The present invention has the aim of more efficiently generating a representation of a probabilistic network which models the variables of an input data set.

SUMMARY OF THE INVENTION

According to the present invention, there is now provided a method of modeling the variables in an input data set by means of a probabilistic network including data nodes and causal links, the method comprising the steps of;

registering the input data set, generating a population of genomes each individually modeling the input data set by means of chromosome data to represent the data nodes in a probabilistic network and the causal links between the data nodes, performing a crossover operation between the chromosome data of parent genomes in the population to generate offspring genomes, performing an addition operation to add the offspring genomes to the said population, performing a scoring operation on genomes in the said population to derive scores representing the correspondence between the genomes and the input data set, performing a selecting operation to select genomes from the population according to the scores, repeating the crossover, scoring, addition and selecting operations for a plurality of generations of the genomes, and selecting, as an output model, a genome from the last generation.

Further according to the present invention there is provided apparatus for modeling the variables in an input data set by means of a probabilistic network including data nodes and causal links, the apparatus comprising;

data register means to register the input data set, generating means for generating a population of genomes each individually modeling the input data set by means of chromosome data to represent the data nodes in a probabilistic network and the causal links between the data nodes, crossover means for performing a crossover operation between the chromosome data of parent genomes in the population to generate offspring genomes, adding means to perform an addition operation to add the offspring genomes to the said population, scoring means for performing a scoring operation on genomes in the said population to derive scores representing the correspondence between the genomes and the input data set, selecting means for performing a selecting operation to select genomes from the population according to the scores, control means to control the crossover, scoring, addition and selecting means to repeat their operations for a plurality of generations of the genomes, and output means to select, as an output model, a genome from the last generation.

BRIEF DESCRIPTION OF THE DRAWINGS

The invention will now be described, by way of example, with reference to the accompanying drawings in which.

DETAILED DESCRIPTION

Figures 1, 2:
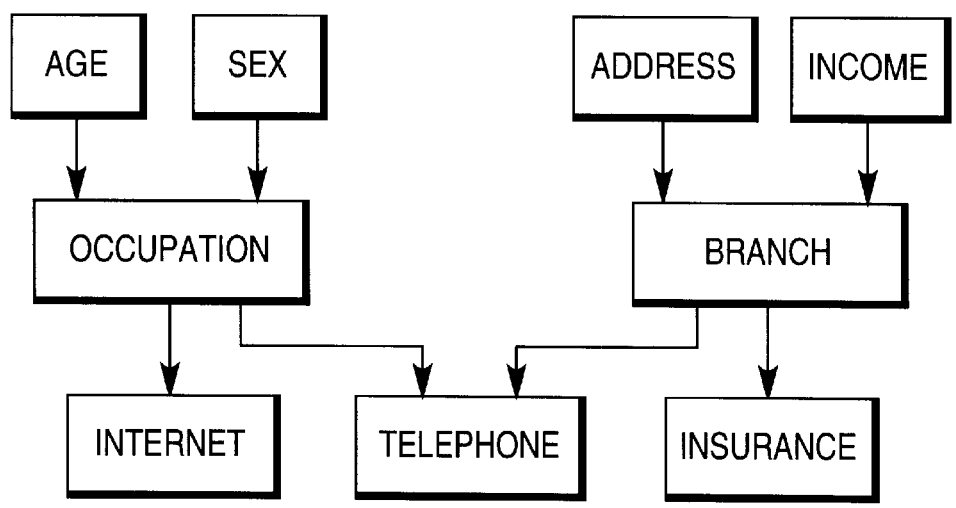
FIG. 1 shows a table of data in an input data set.
FIG. 2 shows a probabilistic network including data nodes and causal links which models the data in FIG. 1.

In FIG. 1, a data set is included in a table 10 of statistical data and includes variables relating to the customers of a bank. The variables include the age, sex, address, occupation and income data which are personal to the customers. In addition the variables include information on whether the customers use telephone banking or internet banking, which branch of the bank holds the customer accounts and whether the customers use the bank to purchase insurance cover. Each line of the table 10 concerns data relating to one of the variables and the columns contain data fields within the data variables. In FIG. 1, the table is shown as an M×N matrix with a common number of data fields for each variable. It will however be apparent that the number of fields used to express the data for any given variable will differ from one variable to another.

A data set such as is represented in FIG. 1 may be regarded as a useful source of information on the choices that a customer might make in using the services offered by the bank. For example inferences might be drawn from the set of data whether a particular customer is likely to opt for telephone banking for example. A powerful tool to help in drawing plausible conclusions from a data set is to build a probabilistic network structure defining the relationships between the variables in the data set. Such a network structure may be modeled as a Bayesian belief network to describe the statistical dependencies in the data set by representing the variables as data nodes within the network structure and dependencies between the variables as arcs interconnecting the data nodes.

FIG. 2 shows a Bayesian belief network which may be postulated as a model to fit the data set of FIG. 1. In this network, the variables of age, sex, address and income are shown as independent variables and the remaining variables are shown as having dependencies marked by the arrows in FIG. 2. The network shows a causal relationship between the variable of age and that of occupation. Another causal relationship is shown between sex and occupation. A causal relationship is marked by the arrow from each independent variable of address and income to the dependent variable of bank branch location. The remaining causal relationships are marked by arrows from the variables of occupation and branch location to the further dependencies of internet banking, telephone banking and purchase of insurance.

Probability distributions are assigned to each of the data nodes so that the model represents graphically the statistical dependencies in the data set. The model is a concise and comprehensible way of recording knowledge about possible causal relationships in the data set.

A difficulty in devising a plausible Bayesian belief network lies in specifying the conditional distribution of each of the variables and in imagining how complex combinations of causal factors interact. The search space of possible network structures increases exponentially with the number of nodes in the network making an exhaustive search for all possible networks impractical.

Figure 3:
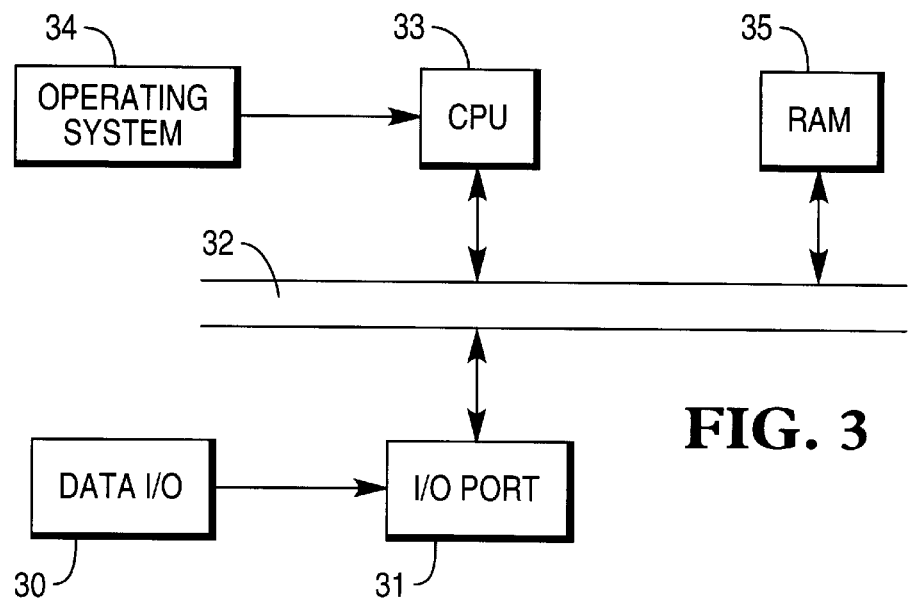
FIG. 3 shows data processing apparatus, according to the invention, for producing a representation of a probabilistic network to model the table of data of FIG. 1.

In FIG. 3 apparatus is shown which provides a means for receiving statistical data as shown in FIG. 1 and for generating Bayesian belief networks to be evaluated as plausible models of the data. Input statistical data passes from a data I/O device 30 through an I/O port 31 for entry to a data bus 32. A central processing unit (CPU) 33 controlled by an operating system 34 controls the entry of data onto the data bus 32. A random access memory 35 is connected to the I/O bus 32 to receive and store data supplied to the bus 32.

Figure 5:
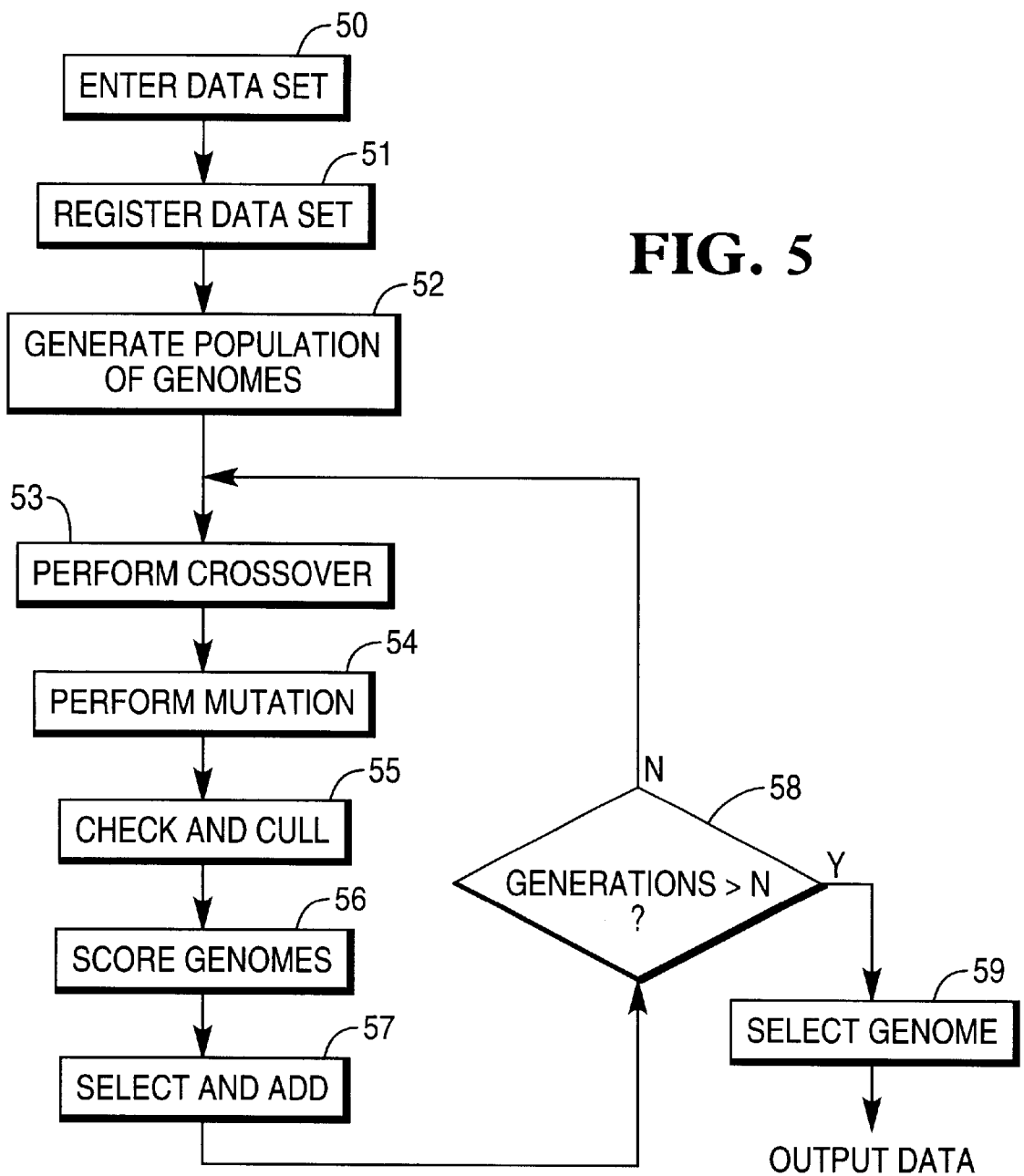
FIG. 5 shows a block diagram of the operating steps performed by the apparatus of FIG. 3.

In response to the entry, by means of the data I/O device 30, of the statistical data representing the variables shown in FIG. 1, the CPU 33 is programmed to enter the data into the memory 35. The data is then processed by the CPU 33 in a sequence of processing operations as represented in the block flow diagram of FIG. 5. In FIG. 5, the entry of the data set through the I/O device 30 is shown as step 50 and the storage of the data set in the memory 35 is shown as step 51. In step 52 the data is reformatted to represent a population of genomes which are stored in the memory 35.

The term genome comes from the field of genetic algorithms. Genetic algorithms are parallel algorithms that transform populations of individual mathematical objects into new populations. The operations that are used to effect the transformation are analogous to those found in natural genetic operations such as sexual recombination or crossover. The individuals in the population are encoded as sequences of numbers which typically consist of a fixed or variable length binary character string. An initial population of genetic algorithms is evaluated to test for fitness with respect to a particular purpose and genetic operations on selected individuals result in the generation of a new population of individuals.

Figure 4:
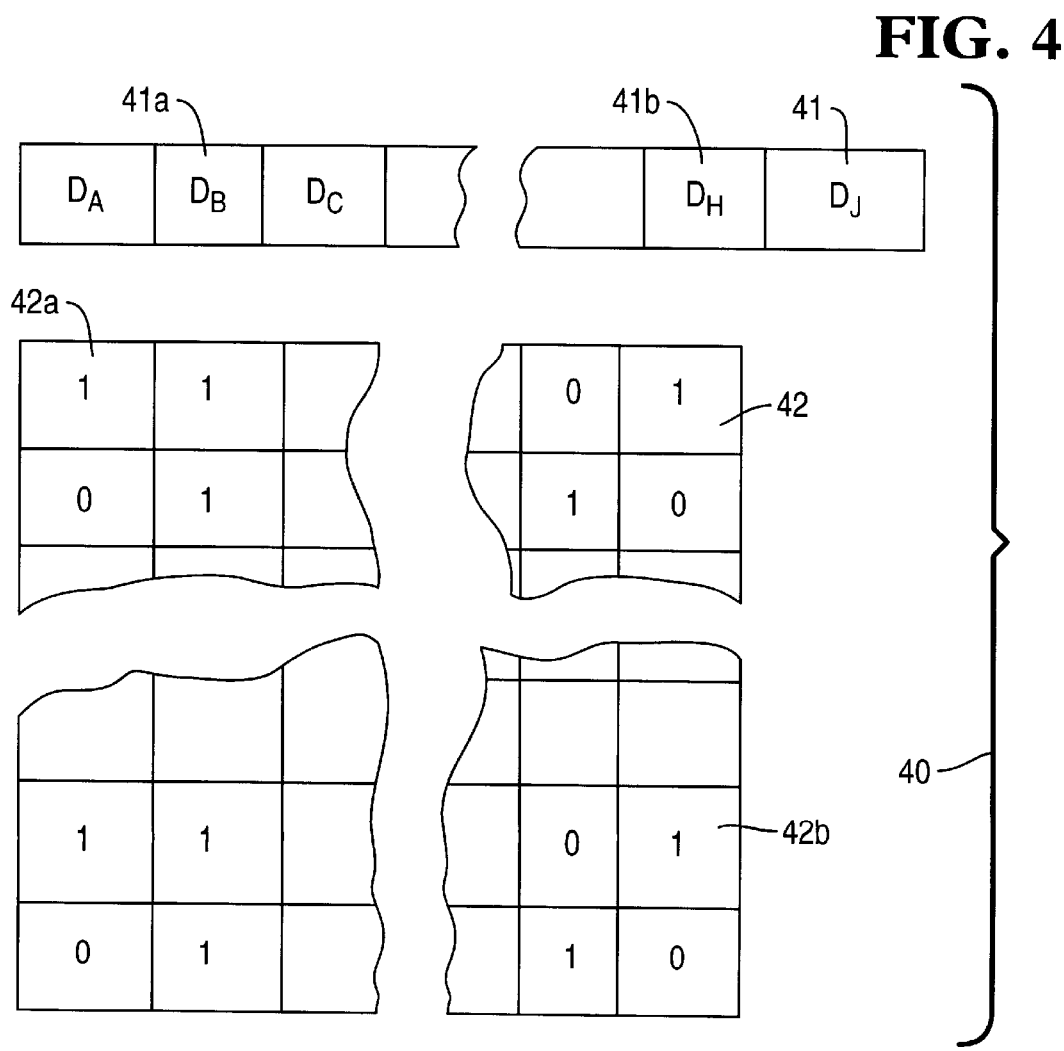
FIG. 4 shows chromosome data included in a genetic algorithm which is processed by the apparatus of FIG. 3.

In step 52 of FIG. 5, an initial population of genomes is generated by the CPU 33 from the data set which is stored in the memory 35. The CPU 33 generates from the data set a different character string of binary numbers for each genome. The character string 40 has two chromosomes 41 and 42 as shown in FIG. 4. The first chromosome 41 encodes selected variables in the data set as data nodes $D_A$ to $D_j$. Each of the data nodes may be encoded to specify either fields in the data or hypothesized "hidden" variables in the data and also specify a particular distribution type such as Gaussian, multinomial or Poisson. The distribution type depends on the nature of the data and whether it is represented as continuous data or categorical data. The second chromosome 42 represents the arcs connecting the data nodes and is a square N×N matrix of ones and zeros where N is the number of nodes in the network and each arc in the element is represented by an element $a_{ij}$ in the matrix. If $a_{ij}=1$ then there is an arc between the nodes i and j.

Referring once more to FIG. 5, the initial population of genomes is subject to crossover operations in step 53. A crossover operator selects genomes at random and performs a crossover operation in which the two chromosomes are inherited independently and crossed over independently. The node chromosome is crossed over by randomly selecting a point along the linear array and copying the portion 41a of the paternal chromosome up to that point. The portion 41b of the maternal genome past that point is copied and spliced to the portion 41a of the paternal chromosome. The broken lines in FIG. 4 indicate the random selection of the point where crossover is effected. It will be apparent that the node chromosome 41 may be a fixed length or variable length character string depending on the nature of the data, the manner in which the genomes are generated in step 52 and the nature of the crossover operation in step 53.

The crossover of the arc chromosome 42 is effected by randomly selecting a line to divide the paternal matrix, copying the portion 42a of the paternal matrix up to that line, copying the portion 42b of the maternal matrix beyond the line, and reordering the portions 42a and 42b into a new matrix. The broken lines in FIG. 4 indicate the random nature of the selection of the portions 42a and 42b. It will be apparent that the size of the square matrix will vary in the case where the node chromosome is a variable length string.

In step 54 the population is subject to random mutation. The mutation step comprises the random selection of a predetermined small proportion of the population of genomes. The randomly selected genomes are mutated by one of four possible mutations. The possible mutations are the addition of a node or the deletion of a node, in respect of the node chromosome 41, and the addition of an arc or the deletion of an arc, in respect of the arc chromosome 42. The addition or deletion of a node in respect of a node chromosome necessitates the updating of the corresponding arc chromosome. Thus the addition of a node will necessitate the addition of a row and column to the arc chromosome and the random generation of arcs connecting the new node to existing nodes. The deletion of a node will necessitate the deletion of the corresponding row and column from the arc chromosome.

Following the mutation step, the population of genomes is subject to a check and cull operation in step 55. In the step 55, checks are made to satisfy that constraints on the structure of the networks are met. One such constraint is to satisfy the requirement that the network is a directed acyclic graph. Prior knowledge also rules out or enforces certain causal links and so some nodes and arcs are constrained to be absent or present and are not subject to mutation. In addition, it is desirable to avoid evolving networks which are equivalent. Equivalent networks have different structures but encode the same probability model. In the step 55 a cull is made of those networks which do not meet the required constraints or which are equivalent to existing members of the population.

A scoring operation is made in step 56 to score the fit of the genomes to the data set. A selection of those genomes which score the best fit to the data set are selected to form the next generation of genomes. The score for each genome is evaluated in relation to how well the network represented by the genome can be fitted to the data set. The score is evaluated by assuming that the data in the data set is a random sample generated from the joint distribution defined by the network. A comparison is made between the values of the variables in the data set and the values generated in the joint distribution, a higher score being achieved by a higher correspondence. The score for each genome is evaluated in turn and stored for comparison with the scores of the other genomes in the same generation. Genomes are selected according to their scores.

Very complex networks model the data more accurately than simpler networks and this can result in over-fitting of the data. The score achieved by each network may thus be constrained by introducing a penalty for the number of nodes and arcs represented in the network.

The process continues through a decision step 58 to iterate the steps 53, 54, 55, 56 and 57 for a pre-set number N of generations of genomes. The iteration continues until, in the decision step 58, the pre-set number of generations is counted. The process thereupon continues to a step 59 where the last generation of genomes is again subject to a scoring operation to select the genome which scores the best fit to the data set. The character string representing the selected genome is supplied to the I/O device 30 as output data.

Of the steps in the process of FIG. 5, it is the steps 55, 56 and 57 that require the most processing power. It will be apparent to those skilled in the art that these steps may be performed by a plurality of processors operating in parallel as an alternative to the single processor shown in FIG. 1. Such a plurality of parallel processors may be operated under the control of a master processor programmed to allocate computing tasks to the parallel processors.

The population of networks in the population formed in step 52 and in step 57 may be subdivided into pools, or demes, of networks such that the probability of crossover occurring between two individuals within a deme is greater than crossover between two individuals in different demes. By this means, the diversity in the population is maintained with a resulting improvement in the score of the final network produced.

What has been described has general application to the production of output data to represent a probabilistic network fitting an input data set. The data set may include data from a wide range of sources and the invention is not restricted to the particular example of a banking data set as described above.

The use of genetic algorithms has a number of advantages over other methods of finding a network topology to represent a data set. Genetic algorithms avoid the problem of local minima found in some search methods (e.g. gradient descent). These occur when a search method becomes trapped in a region of parameter space with a locally high, but globally low, fitness.

Genetic algorithms are inherently parallel and so can speed up the search process by the addition of new processors without modification to the code used to implement the search. Prior constraints, such as domain knowledge acquired from experts, can be easily applied to the search space by putting analogous constraints onto the generation of genomes.

What is claimed is:

1. A method of modeling the variables in an input data set by means of a probabilistic network including data nodes and causal links, said input data set containing statistical data relating to at least a portion of a population group, the variables being personal to customers of a business enterprise, the method comprising the steps of:

registering the input data set;
   generating a population of genomes each individually modeling the input data set by means of chromosome data to represent the data nodes in a probabilistic network and the causal links between the data nodes;
   performing a crossover operation between the chromosome data of parent genomes in the population to generate offspring genomes;
   performing an addition operation to add the offspring genomes to the population;
   performing a scoring operation on genomes in the population to derives scores representing the correspondence between the genomes and the input data set;
   performing a selecting operation to select genomes from the population according to the scores;
   repeating the crossover, scoring, addition and selecting operations for a plurality of generations of the genomes;
   selecting, as an output model, a genome from the last generation; and
   forming predictions relating to future behavior of said population group.

2. A method according to claim 1, further comprising the step of randomly mutating the genomes.

3. A method according to claim 2, wherein the step of randomly mutating the genomes comprises adding a data node.

4. A method according to claim 2, wherein the step of randomly mutating the genomes comprises deleting a data node.

5. A method according to claim 2, wherein the step of randomly mutating the genomes comprises adding a causal link.

6. A method according to claim 2, wherein the step of randomly mutating the genomes comprises deleting a causal link.

7. A method according to claim 1, wherein the chromosome data of each genome includes a node chromosome in the form of a linear array of node data and a causal link chromosome in the form of a matrix of causal links.

8. A method according to claim 7, wherein the crossover operation provides the offspring genomes with independently inherited node and causal link chromosomes.

9. A method according to claim 1, further comprising the step of culling genomes which fail to meet predetermined structural constraints.

10. A method according to claim 9, wherein the predetermined structural constraints comprise the exclusion of preselected causal links.

11. A method according to claim 9, wherein the predetermined structural constraints comprise the exclusion of genomes that do not represent directed acyclic graphs.

12. Apparatus for modeling the variables in an input data set by means of a probabilistic network including data nodes and causal links, said input data set containing statistical data relating to a population group, the variables being personal to customers of a business enterprise, the apparatus comprising:

data register means for registering the input data set;

generating means for generating a population of genomes each individually modeling the input data set by means of chromosome data to represent the data nodes in a probabilistic network and the causal links between the data nodes;

crossover means for performing a crossover operation between the chromosome data of parent genomes in the population to generate offspring genomes;

adding means for performing an addition operation to add the offspring genomes to the population;

scoring means for performing a scoring operation on genomes in the population to derive scores representing the correspondence between the genomes and the input data set;

selecting means for performing a selecting operation to select genomes from the population according to the scores;

control means for controlling the crossover, scoring, addition and selecting means to repeat their operations for a plurality of generations of the genomes;

output means for selecting, as an output model, a genome from the last generation; and means for forming predictions relating to future behavior of said population group.

13. Apparatus according to claim 12, further comprising mutating means for randomly mutating the genomes.

14. Apparatus according to claim 13, wherein the mutating means is adapted for performing random mutation which comprises adding a data node.

15. Apparatus according to claim 13, wherein the mutating means is adapted for performing random mutation which comprises deleting a data node.

16. Apparatus according to claim 13, wherein the mutating means is adapted for performing random mutation which comprises adding a causal link.

17. Apparatus according to claim 13, wherein the mutating means is adapted for performing random mutation which comprises deleting a causal link.

18. Apparatus according to claim 12, wherein the generating means is adapted for generating genomes each of which includes a node chromosome in the form of a linear array of node data and a causal link chromosome in the form of a matrix of causal links.

19. Apparatus according to claim 18, wherein the crossover means is adapted for providing the offspring genomes with independently inherited node and causal link chromosomes.

20. Apparatus according to claims 12, further comprising culling means for culling genomes which fail to meet predetermined structural constraints.

21. Apparatus according to claim 20, wherein the predetermined structural constraints comprise the exclusion of preselected causal links.

22. Apparatus according to claim 20, wherein the predetermined structural constraints comprise the exclusion of genomes that do not represent directed acyclic graphs.

23. A method of data mining employing modeling the variables in an input data set to enable the reduction of the knowledge about relationships between the variables by means of a probabilistic network including data nodes and causal links, said input data set containing statistical data relating to at least a portion of a population group, the method comprising the steps of:

registering the input data set for a plurality of customers of an enterprise;

generating a population of genomes each individually modeling the input data set by means of chromosome data to represent the data nodes in a probabilistic network and the causal links between the data nodes;

performing a crossover operation between the chromosome data of parent genomes in the population to generate offspring genomes;

performing an addition operation to add the offspring genomes to the population;

performing a scoring operation on genomes in the population to derive scores representing the correspondence between the genomes and the input data set;

performing a selecting operation to select genomes from the population according to the scores;

repeating the crossover, scoring, addition and selecting operations for a plurality of generations of the genomes;

selecting, as an output model, a genome from the last generation; and forming predictions relating to future behavior of said population group to mine data from the input data set.

24. The method of claim 23 wherein the variables comprise the age, sex, address, occupation and income data for the plurality of customers.

25. The method of claim 24 wherein the enterprise is a bank and the variables further comprise information on whether the customers use telephone banking or internet bank, which branch of the bank holds an account for a particular customer and whether the customers use the bank to purchase insurance coverage.

26. Apparatus for data mining employing modeling the variables in an input data set to enable the reduction of the knowledge about relationships between the variables by means of a probabilistic network including data nodes and causal links, said input data set containing statistical data relating to a population group, the apparatus comprising:

data register means for registering the input data set for a plurality of customers of an enterprise;

generating means for generating a population of genomes each individually modeling the input data set by means of chromosome data to represent the data nodes in a probabilistic network and the causal links between the data nodes;

crossover means for performing a crossover operation between the chromosome data of parent genomes in the population to generate offspring genomes;

adding means for performing an addition operation to add the offspring genomes to the population;

scoring means for performing a scoring operation on genomes in the population to derive scores representing the correspondence between the genomes and the input data set;

selecting means for performing a selecting operation to select genomes from the population according to the scores;

control means for controlling the crossover, scoring, addition and selecting means to repeat their operations for a plurality of generations of the genomes;

output means for selecting, as an output model, a genome from the last generation; and means for forming predictions relating to fixture behavior of said population group to mine data from the input data set.

27. The apparatus of claim 26 wherein the data register means comprises a random access memory to receive and store data supplied to an input bus through an input port connected to an input device.

28. The apparatus of claim 26 wherein the generating means comprises a central processing unit controlled by an operating system to operate on the input data set to generate a different character string of binary numbers for each genome.

* * * * *

UNITED STATES PATENT AND TRADEMARK OFFICE
CERTIFICATE OF CORRECTION

PATENT NO. : 6,480,832 B2
DATED : November 12, 2002
INVENTOR(S) : Ramin C. Nakisa It is certified that error appears in the above-identified patent and that said Letters Patent is hereby corrected as shown below:

<u>Column 8,</u>
Line 61, after "to", delete "fixture" and insert -- future --.

Signed and Sealed this

Twenty-second Day of April, 2003

JAMES E. ROGAN
*Director of the United States Patent and Trademark Office*